Patented May 26, 1953

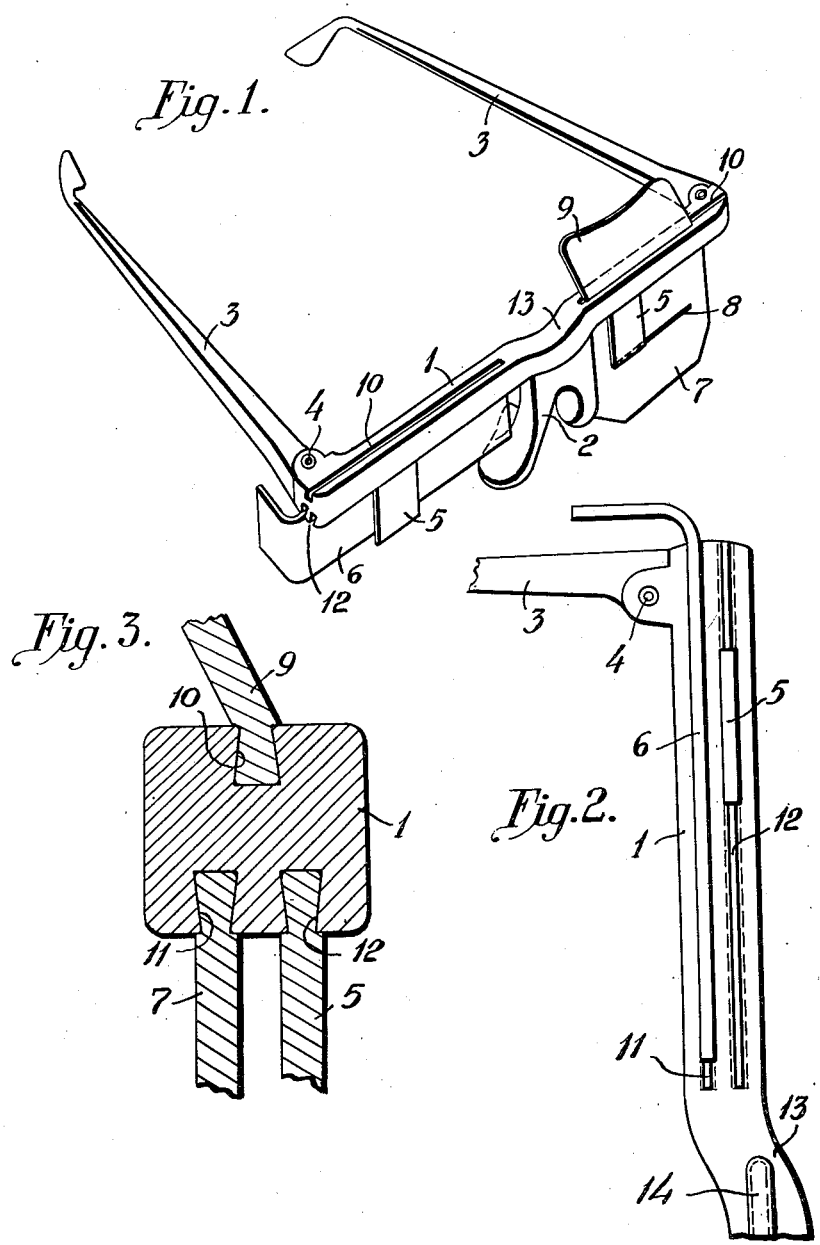

2,639,429

UNITED STATES PATENT OFFICE 2,639,429

CARRIER FOR EYEGLASSES, DIMMER-GLASSES, AND THE LIKE

Sven H. Lundberg, Lidingo, Sweden

Application October 23, 1950, Serial No. 191,523
In Sweden October 14, 1950

4 Claims. (Cl. 2—14)

The present invention refers to a carrier for means for shielding the eye from glare of headlights and other intensive illumination and more particularly to driving glasses for use by drivers of motor vehicles.

A object of the invention is to provide means whereby the wearers have the possibility to equip the carrier with one, two or three shields at each eye and to remove said shields.

Another object is to provide means whereby the mutual position of the shields may be varied in such a manner that the distance between the shields and the eye is varied.

Another object of the invention is to provide a carrier for shields having mounting members for the shields permitting lateral adjustment of each shield for each eye.

Other objects will be apparent when reference is made to the specification and to the drawings in which:

Figure 1 is a perspective view of a spectacle frame provided with two and three shields respectively at each eye.

Figure 2 shows part of the same frame as viewed from below on an enlarged scale.

Figure 3 is a cross section of the frame on a further more enlarged scale.

According to Figure 1, a horizontal shield supporting bar 1 having a nose piece 2 is in the usual manner provided with bows 3, which are connected with the bar by means of pins 4. For the one eye the bar carries a traffic screen 5 and a sun screen 6. For the other eye the bar is equipped with a traffic screen 5, a sun screen 7 having a horizontal slot 8 and a sun screen 9 arranged on the upper side of the bar 1. This latter is intended to screen sunrays coming from above, which otherwise would pass above the bar 1 towards the eye. The other screens are so formed and located as to cover the entire or part of the field of sight. The screens 6 cover the upper field of sight and the screens 7 cover the entire field of sight, the slot 8 affording, however, free sight over a limited range of the field of sight. The screens 5 are particularly intended to be used in darkness as a protection against dazzling from the headlights of meeting vehicles. The screens are so designed and arranged as to cover merely a portion of the field of sight, namely in case of left-hand traffic the right-hand upper portion and in case of right-hand traffic the left-hand upper portion of the field of sight.

The screens are removable so that merely the screens necessary for the time being may be fitted in the frame. However, the screens 5 may normally be located in the frame also when using the screens 6 and 7. When changing from day driving to night driving the screens 6 or 7 are preferably demounted, whereby the screens 5 become active.

According to my invention the shield supporting bar is formed with longitudinally arranged grooves for receiving corresponding tongue members of the shields. Figure 3 shows the bar 1 in cross-section formed with grooves having dove-tailed cross-section. At the upper side of the bar there is a groove 10, which opens upwardly in the upper side of the frame. In this groove, the screen 9 may be disposed. Grooves 11 and 12 are located on the lower side of the frame. The screen 7 is inserted in the groove 11 and the screen 5 in the groove 12. Of course, the screens intended for the grooves 11 and 12 may be interchanged for each other because all the grooves have one and the same dimension. In this way it is rendered possible to equip the frame with those screens which are necessary for the time being, but there is also a possibility of locating extra screens in inoperative positions. The essential advantage of a frame according to the design above described resides in the fact that the frame may be fitted with more than one screen for each eye so that by a simple manipulation superfluous screens may be removed or brought into inoperative positions. Furthermore the mutual position of the screens may be varied in such a manner that the distance between the screens and the eye can be chosen in the most suitable way.

All the grooves open in the end surfaces of the bar 1 and end near the mid-portion of the bar adjacent a bulged arcuate portion 13 which carries the nose bridge member 2. This last-mentioned member is arranged detachably and formed with a dove-tailed groove having the same cross sectional area as a tongue member 14 mounted on the lower side of the portion 13 and extending in the longitudinal direction of the frame.

In mounting the different screens due to its size the screens 6 and 7 are easy to manipulate. As a rule, the screen 5 can be maintained in its mounted position and needs but rarely be removed from the frame or be moved into another position in the same groove.

It is understood that the design of the carrier and the shields may be accordingly modified to different designs without departing from the spirit of the invention and within the scope of the following claims.

What I claim is:

1. A carrier for means for shielding the eye from the glare of headlights and other intensive illumination, comprising a horizontal shield supporting bar having a pair of bows, a nose bridge member and being provided with longitudinally arranged grooves for receiving corresponding tongue members of at least two shields for each eye, said grooves permitting the shields to be adjustable slidably along the horizontal supporting bar in relation to each other and to the eyes.

2. A carrier for means for shielding the eye from the glare of headlights and other intensive illumination, comprising a horizontal shield supporting bar having a pair of bows, a nose bridge member and being provided with longitudinally arranged grooves at its lower edge for receiving corresponding tongue members of two shields for each eye and longitudinally arranged grooves at its upper edge for receiving a corresponding tongue member of one shield for each eye, said grooves permitting the shields to be adjustable slidably along the horizontal supporting bar in relation to each other and to the eyes.

3. A carrier according to claim 1, in which all the grooves open into the outer end surfaces of the supporting bar.

4. A carrier according to claim 1, in which the nose bridge member is arranged detachably.

SVEN H. LUNDBERG.

References Cited in the file of this patent

UNITED STATES PATENTS

| Number | Name | Date |
|---|---|---|
| 234,039 | Johnson | Nov. 2, 1880 |
| 378,965 | Krause | Mar. 6, 1888 |
| 1,386,989 | Capper | Aug. 9, 1921 |
| 2,386,998 | Young | Oct. 16, 1945 |
| 2,408,273 | Sager | Sept. 24, 1946 |